US011919260B2

(12) United States Patent
Ravey et al.

(10) Patent No.: US 11,919,260 B2
(45) Date of Patent: Mar. 5, 2024

(54) METHOD FOR SHAPING A FIBROUS PREFORM BY COMPACTING IN ORDER TO PRODUCE A COMPOSITE MATERIAL PART

(71) Applicant: SAFRAN, Paris (FR)

(72) Inventors: Christophe Ravey, Moissy-Cramayel (FR); Olivier Foussard, Moissy-Cramayel (FR); Nicolas Pierre Lanfant, Moissy-Cramayel (FR); Didier Payen, Moissy-Cramayel (FR); Adrien Touze, Moissy-Cramayel (FR); Romain Venat, Moissy-Cramayel (FR)

(73) Assignee: SAFRAN, Paris (FR)

( * ) Notice: Subject to any disclaimer, the term of this patent is extended or adjusted under 35 U.S.C. 154(b) by 0 days.

(21) Appl. No.: 17/271,456

(22) PCT Filed: Aug. 27, 2019

(86) PCT No.: PCT/FR2019/051975
§ 371 (c)(1),
(2) Date: Feb. 25, 2021

(87) PCT Pub. No.: WO2020/043988
PCT Pub. Date: Mar. 5, 2020

(65) Prior Publication Data
US 2021/0323250 A1    Oct. 21, 2021

(30) Foreign Application Priority Data

Aug. 27, 2018 (FR) ........................................ 1857678

(51) Int. Cl.
*B29C 70/48* (2006.01)
*B29B 11/16* (2006.01)
(Continued)

(52) U.S. Cl.
CPC .............. *B29C 70/48* (2013.01); *B29B 11/16* (2013.01); *B29C 70/24* (2013.01); *B29C 70/543* (2013.01);
(Continued)

(58) Field of Classification Search
CPC ....... B29C 70/48; B29C 70/24; B29C 70/543; B29B 11/16
(Continued)

(56) References Cited

U.S. PATENT DOCUMENTS 7,101,154 B2   9/2006 Dambrine et al.
7,241,112 B2   7/2007 Dambrine et al.
(Continued)

FOREIGN PATENT DOCUMENTS

FR   3 046 563 A1    7/2017
WO   WO 2010/061140 A1   6/2010
WO   WO 2018/041990 A1   3/2018

OTHER PUBLICATIONS

Six (English Translation of FR3046563, published Jul. 14, 2017) (Year: 2017).*
(Continued)

*Primary Examiner* — Matthew J Daniels
*Assistant Examiner* — Hana C Page
(74) *Attorney, Agent, or Firm* — Pillsbury Winthrop Shaw Pittman LLP

(57) ABSTRACT

A process for shaping, by compaction, a fibrous structure obtained by three-dimensional or multilayer weaving between a plurality of layers of warp yarns and a plurality of layers of weft yarns. The yarns of each plurality of layers of warp yarns and layers of weft yarns are coated with a sizing composition. The shaping includes a pre-compaction stage followed by a stage of final compaction of the fibrous structure. During pre-compaction and final compaction, the
(Continued)

fibrous structure is at a temperature greater than or equal to the softening temperature of the sizing composition. The process further includes the cooling of the fibrous preform obtained after final compaction of the fibrous structure.

10 Claims, 7 Drawing Sheets

(51) Int. Cl.
    *B29C 70/24*    (2006.01)
    *B29C 70/54*    (2006.01)
    *F01D 5/28*    (2006.01)
    *B29L 31/08*    (2006.01)

(52) U.S. Cl.
    CPC ........ *F01D 5/282* (2013.01); *B29L 2031/082* (2013.01); *F05D 2230/20* (2013.01)

(58) Field of Classification Search
    USPC .......................................................... 264/257
    See application file for complete search history.

(56) References Cited

U.S. PATENT DOCUMENTS

| | | | |
|---|---|---|---|
| 7,581,932 B2* | 9/2009 | Coupe | B29C 70/24 |
| | | | 264/328.2 |
| 11,230,034 B2* | 1/2022 | Naumann | B29C 43/203 |
| 2007/0092379 A1 | 4/2007 | Coupe et al. | |
| 2014/0138872 A1* | 5/2014 | Hattori | B29C 70/48 |
| | | | 264/250 |
| 2014/0175709 A1 | 6/2014 | Blackburn et al. | |
| 2016/0288380 A1* | 10/2016 | Marchal | B29B 13/06 |
| 2019/0255738 A1* | 8/2019 | Risicato | B29B 11/16 |

OTHER PUBLICATIONS

International Search Report as issued in International Patent Application No. PCT/FR2019/051975, dated Dec. 9, 2019.

* cited by examiner

METHOD FOR SHAPING A FIBROUS PREFORM BY COMPACTING IN ORDER TO PRODUCE A COMPOSITE MATERIAL PART

CROSS-REFERENCE TO RELATED APPLICATIONS

This application is the U.S. National Stage of PCT/FR2019/051975, filed Aug. 27, 2019, which in turn claims priority to French patent application number 1857678 filed Aug. 27, 2018. The content of these applications are incorporated herein by reference in their entireties.

BACKGROUND OF THE INVENTION

The invention relates to turbomachine parts made of composite material comprising a fibrous reinforcement densified by a matrix, the matrix being obtained by injecting a liquid composition containing a precursor of the matrix into a fibrous preform.

One target area is gas turbine blades for aeroengines or industrial turbines.

The manufacture of a composite material blade comprises the following steps:
a) production of a fibrous structure by three-dimensional or multilayer weaving,
b) placement of the fibrous structure in a compacting and forming tool,
c) shaping of the fibrous structure by application of a compaction pressure to the fibrous structure present in the compacting and forming tool so as to obtain a fibrous preform of the blade to be manufactured,
d) placement of the fibrous preform in an injection tool,
e) injection of a liquid precursor composition of a matrix material such as a resin into the fibrous preform,
f) transformation of the liquid composition into a matrix so as to obtain a composite material blade comprising a fibrous reinforcement densified by a matrix.

The operation of shaping the fibrous texture by compaction is tricky because the weaving pattern or weave on the surface and at the core of the fibrous structure must not be altered. To this end, it is necessary that the fibers of the fibrous structure adapt flexibly to the deformation imposed on the fibrous structure, in particular in the thicker areas of the fibrous structure.

As described in document US 2007/092379, a known solution consists in wetting the fibrous structure abundantly with water before shaping, the water playing the role of lubricant in order to thus facilitate slippage between the fibers. However, once shaped, the preform must be dried in order to remove water, the presence of which is undesirable during the subsequent operations of injection and transformation of the liquid matrix precursor composition. Indeed, water makes it difficult to evacuate the injection tool. Moreover, during the transformation heat treatment of the liquid composition, water vapor can be trapped in the preform, leading to the formation of porosities in the final part which alter the mechanical properties of the composite material.

Subject Matter and Summary of the Invention

The purpose of the present invention is, therefore, to propose a solution facilitating the shaping of a fibrous structure by compaction but without the aforementioned disadvantages.

To this end, the invention proposes in particular a process for shaping, by compaction, a fibrous structure obtained by three-dimensional or multilayer weaving between a plurality of layers of warp yarns and a plurality of layers of weft yarns, the yarns of each plurality of layers of warp yarns and layers of weft yarns being coated with a sizing composition, characterized in that the shaping comprises a step of pre-compaction of the fibrous structure in a pre-compacting tool so as to reduce the thickness of the fibrous structure to an intermediate thickness comprised between the thickness of the fibrous structure after weaving and a determined final thickness, the pre-compaction step being followed by a final compaction step in a forming tool, and in that, during the pre-compaction and final compaction steps, the fibrous structure is at a temperature greater than or equal to the softening temperature of the sizing composition, and in that the process further comprises the cooling of the fibrous preform obtained after the step of final compaction of the fibrous structure.

Such a heating softens the fibrous structure and facilitates its shaping without disturbing the weave(s) or weaving pattern(s) of the latter. Indeed, the sizing present on the yarns helps stiffen the fibrous structure, thus preventing the fibers of the weaving yarns from freely following the deformation imposed during compaction. By heating the fibrous structure to a temperature greater than or equal to the softening temperature of the sizing composition coating the yarns, the sizing momentarily loses its tackifying character, thus facilitating slippage between fibers. Moreover, with the shaping process of the present invention, it is no longer necessary to wet the fibrous structure for its compaction as is the case with the solutions of the prior art. The manufacturing time of a composite material part is thus shortened.

Furthermore, the pre-compaction step allows better control of the deformation of the fibrous structure and facilitates the closing of the forming tool during final compaction. Indeed, when the fibrous structure is wetted, the water acts as a lubricant that facilitates slippage between the yarns, thus reducing disruption or disturbance of the initial weave during compaction. When the structure is dry, i.e., free of water, there is no more lubricant between the yarns. The risk of disorganization of the woven yarns is therefore greater. To this end, the process of the invention proposes a pre-compaction step to reduce the thickness of the fibrous structure to an intermediate thickness that allows the application of a compaction force less than that necessary to reach the final thickness targeted for the preform, thus minimizing the impact of compaction on the organization of the structure yarns. Similarly, the final compaction is carried out with the structure in a pre-compacted state, i.e., already having a reduced thickness compared with its initial thickness. The compaction force for final compaction is also less than that required to reach the final thickness targeted for the preform without pre-compaction, thus minimizing the impact of compaction on the organization of the structure yarns. The pre-compaction step also facilitates the closing of the forming tool for final compaction because the structure already has a reduced thickness compared with its initial thickness at the exit of the loom.

Finally, the pre-compaction step being carried out in a different tool from that used for the final compaction step, it is possible to control the state of the structure between these two steps.

According to a particular feature of the process of the invention, the fibrous structure is free of water during the pre-compaction and final compaction steps. The absence of water in the fibrous structure during its shaping by compaction makes it easier to evacuate the tool during the injection of the liquid matrix precursor and to avoid the appearance of porosity in the composite material of the final part.

According to another particular feature of the process of the invention, the fibrous structure is heated to a temperature greater than or equal to the softening temperature of the sizing composition prior to closing the pre-compacting or forming tool.

According to another particular feature of the process of the invention, the pre-compacting or forming tool comprises heating means capable of bringing the fibrous structure to a temperature greater than or equal to the softening temperature of the sizing composition.

According to another particular feature of the process of the invention, the forming tool comprises cooling means capable of bringing the fibrous structure to a temperature below the softening temperature of the sizing composition.

The invention also relates to a process for manufacturing a composite material part comprising the following steps:
 a) production of a fibrous structure by three-dimensional or multilayer weaving,
 b) shaping of the fibrous structure by compaction in accordance with the shaping process according to the invention,
 c) injection of a liquid composition comprising at least one precursor of a matrix material into the fibrous preform,
 d) transformation of the liquid composition into a matrix so as to obtain a composite material part comprising a fibrous reinforcement densified by a matrix.

According to a particular characteristic of the manufacturing process of the invention, the step of final compaction of the fibrous structure, the injection of a liquid composition comprising at least one precursor of a matrix material and the transformation of said liquid composition into a matrix are carried out with the preform held in the forming tool, said forming tool comprising at least one port.

According to another particular feature of the manufacturing process of the invention, the composite material part corresponds to an aeroengine fan blade.

BRIEF DESCRIPTION OF THE DRAWINGS

Other features and advantages of the invention will emerge from the following description of particular embodiments of the invention, given by way of non-limiting examples, with reference to the appended drawings, on which.

DETAILED DESCRIPTION OF EMBODIMENTS

The invention generally applies to the production of composite material parts, the parts being produced from a fibrous preform into which a liquid precursor composition of a matrix material is injected and then transformed so as to obtain a part comprising a fibrous reinforcement densified by a matrix.

Hereinbelow, the present invention is described in application to the manufacture of a gas turbine composite material blade, such as an aeroengine blade.

The process for manufacturing a composite material blade according to the invention begins with the production of a fiber blank obtained by three-dimensional weaving or by multilayer weaving.

As used herein, "three-dimensional weaving" or "3D weaving" means a weaving method in which at least some of the warp yarns bind weft yarns over several weft layers, for example an "interlock weave". As used herein, "interlock weave" means a 3D weave in which each warp layer interlinks several weft layers with all the yarns of the same warp column having the same movement in the weave plane.

As used herein, "multilayer weave" refers to a 3D weave with several weft layers whose basic weave of each layer is equivalent to a classic 2D fabric weave, such as a plain, satin or twill weave, but with certain points of the weave that interlink the weft layers together.

The production of the fibrous structure by 3D or multilayer weaving makes it possible to obtain a bond between the layers, thus to have a good mechanical strength of the fibrous structure and of the composite material part obtained, in a single textile operation.

It may be advantageous to promote, after densification, a surface finish free of significant irregularities, i.e., a good finish to avoid or limit finishing operations by machining or to avoid the formation of clumps of resin in the case of resin-matrix composites. To this end, in the case of a fibrous structure having an inner part, or core, and an outer part, or skin, adjacent to an outer surface of the fibrous structure, the skin is preferably woven with a weave of the cloth, satin or twill type in order to limit surface irregularities, a weave of the satin type also providing a smooth surface appearance.

It is also possible to vary the three-dimensional weave in the core part, for example by combining different interlock weave, or an interlock weave and a multilayer weave, or different multilayer weaves. It is also possible to vary the skin weave along the outer surface.

An example of the production of a fibrous structure in accordance with the invention is now described. In this example, the weaving is carried out on a Jacquard type loom.

Figure 1:
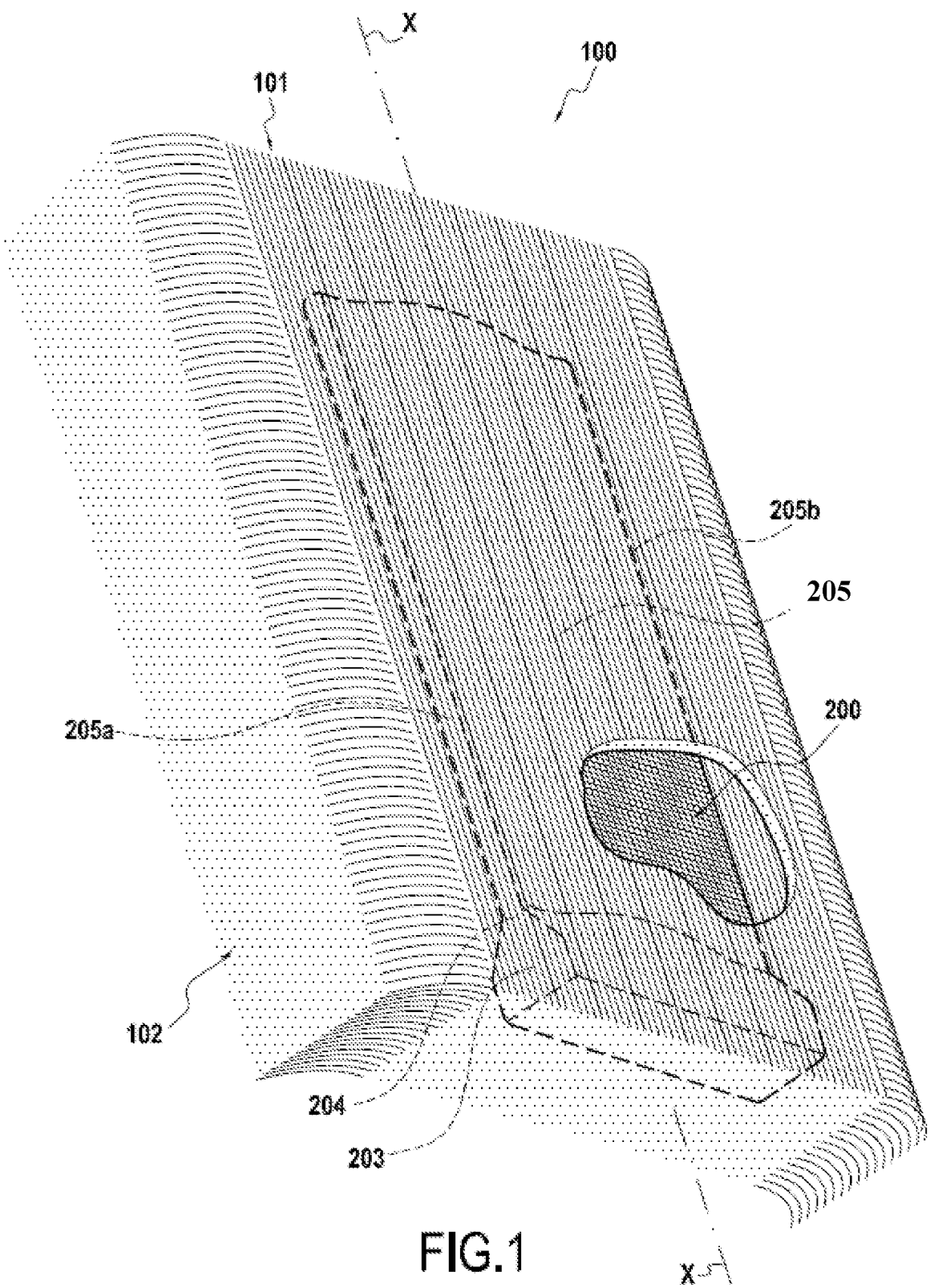
FIG. 1 is a highly schematic illustration of a three-dimensional woven fiber blank intended for the production of a fibrous structure according to an embodiment of the invention.
Figure 2:
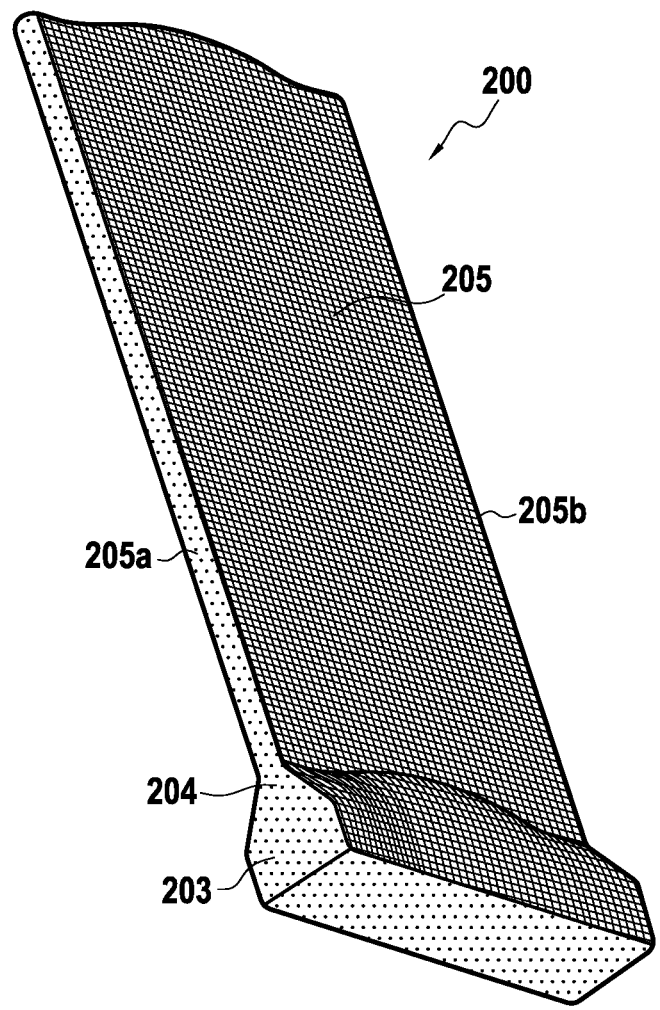
FIG. 2 is a schematic view of a fibrous structure obtained from the fiber blank of FIG. 1.

FIG. 1 shows very schematically the weaving of a fiber blank 100 from which can be extracted a fibrous structure 200 (FIG. 2) to obtain, after compacting and shaping, a fibrous reinforcement preform of an aeroengine blade.

The fiber blank 100 is obtained by three-dimensional weaving, or 3D weaving, or by multilayer weaving carried out in a known manner using a Jacquard type loom on which a bundle of warp yarns or strands 101 has been arranged in a plurality of layers, the warp yarns being interlinked by weft layers 102 also arranged in a plurality of layers, some of the weft layers comprising braids as explained in detail below. A detailed example of the production of a fibrous preform intended to form the fibrous reinforcement of an aeroengine blade from a 3D woven fiber blank is in particular described in detail in documents U.S. Pat. Nos. 7,101,154, 7,241,112 and WO 2010/061140.

The warp and weft yarns belong to the group consisting of carbon fibers, glass fibers, silica fibers, silicon carbide fibers, alumina fibers, aramid fibers and aromatic polyamide fibers.

The warp and weft yarns are coated with a sizing composition.

The fiber blank 100 is woven in the form of a strip extending generally in a direction X corresponding to the longitudinal direction of the blade to be produced. In the fiber blank 100, the fibrous structure 200 has a variable thickness which is determined by the longitudinal thickness and the profile of the blade section of the blade to be produced. In its part intended to form a root preform, the fibrous structure 200 has a part of excess thickness 203 determined according to the thickness of the root of the blade to be produced. The fibrous structure 200 is extended by a part of decreasing thickness 204 intended to form the blade stilt and then by a part 205 intended to form the blade section of the blade. The part 205 has in a direction perpendicular to the direction X a profile with variable thickness between its edge 205a intended to form the leading edge of the blade and its edge 205b intended to form the trailing edge of the blade to be produced.

The fibrous structure 200 is woven in one piece and must have, after cutting the non-woven yarns from the blank 100, the almost definitive shape and dimensions of the blade ("net shape"). To this end, in the areas of varying thickness of the fibrous structure, as in the area of decreasing thickness 204, the decrease in thickness of the preform is achieved by gradually removing layers of weft during weaving.

Once the weaving of the fibrous structure 200 into the blank 100 is completed, the non-woven yarns are cut. The fibrous structure 200 shown in FIG. 2 and woven in one piece is thus obtained. At this stage, i.e., after weaving, the fibrous structure has a high degree of expansion and an initial thickness that must be reduced during subsequent shaping. By way of example, the fibrous structure can have an initial thickness after weaving corresponding to 120% of the final thickness targeted.

The next step consists in shaping, by compaction, the fibrous structure 200 to form a fiber preform ready to be densified. To this end and in accordance with the invention, the fibrous structure is first subjected to a pre-compaction step consisting in reducing the initial thickness of the preform to an intermediate thickness comprised between the initial thickness of the fibrous structure after weaving and a determined final thickness. The pre-compaction step is carried out in a pre-compacting tool (not shown) which may for example resemble the forming tool 300 described below but with larger internal molding impression dimensions in order to achieve intermediate compaction. By way of example, the pre-compaction step can be carried out so as to reduce the initial thickness of the fibrous structure to a value corresponding to roughly 113% of the final target thickness. By reducing the initial thickness of the fibrous structure to a value intermediate to the final target thickness, a moderate compaction force is applied to the structure compared with the compaction force required to directly reduce the thickness of the fibrous structure to the final target thickness. The risks of disruption of the arrangements between the woven yarns are reduced, in particular when the fibrous structure is dry and therefore free of lubricant.

Figure 3:
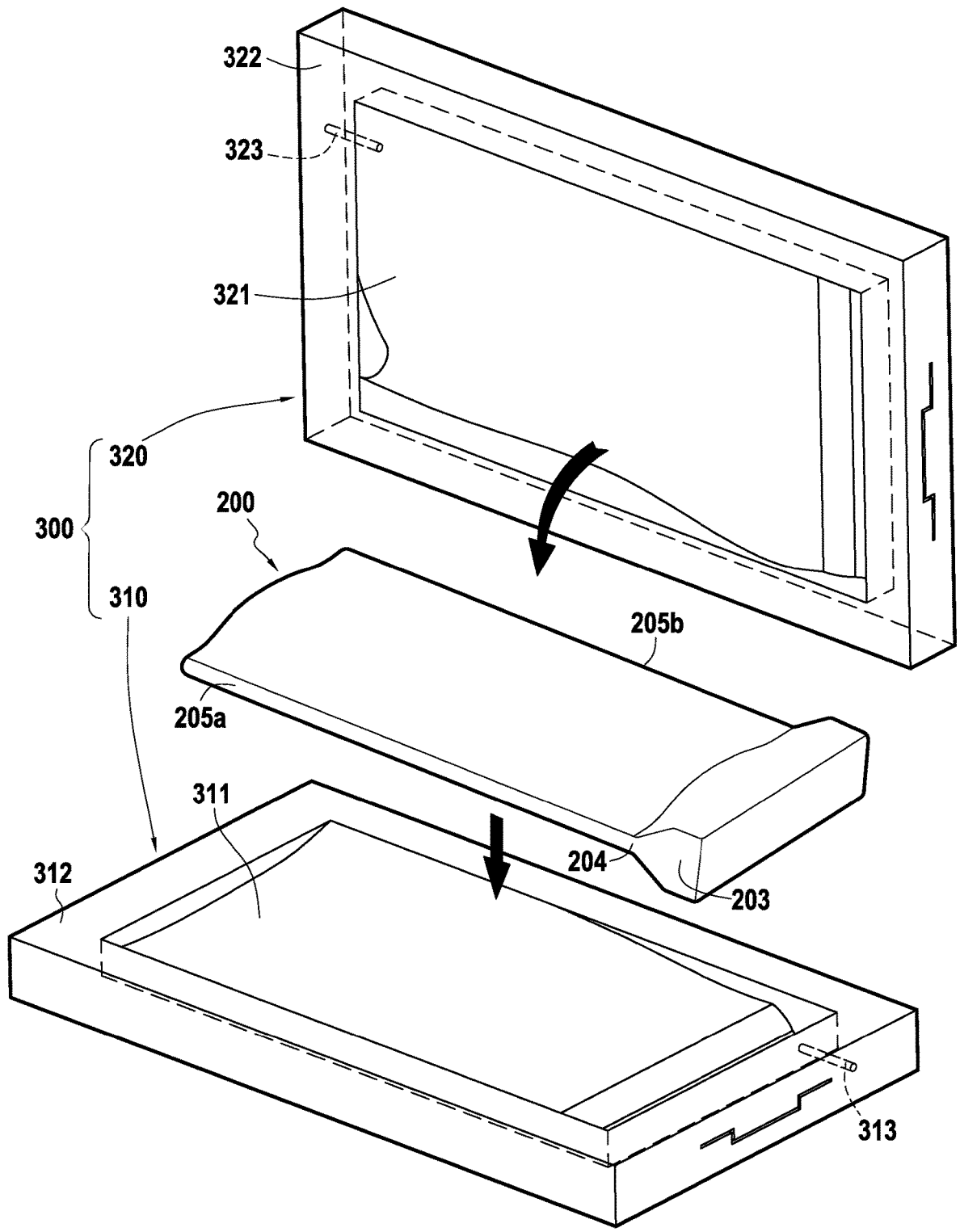
FIG. 3 is an schematic exploded perspective view showing a forming tool in accordance with an embodiment of the invention and the placement of the fibrous structure of FIG. 2 therein.

The shaping of the fibrous structure continues with a step of final compaction of the fibrous structure to complete the thickness reduction to reach 100% of the targeted final thickness. To this end, the fibrous structure is placed in a forming tool 300 which, as shown in FIG. 3, comprises a first shell 310 comprising in its center a first impression 311 corresponding in part to the shape and dimensions of the blade to be produced, the impression 311 being surrounded by a first contact plane 312. During the changeover from the pre-compacting tool to the forming tool, it is possible to check the condition of the fibrous structure, particularly with regard to the orientation of the yarns, which makes it possible to interrupt the process in the event of a problem and avoids unnecessary additional manufacturing costs in the event of a major defect at this stage of manufacturing.

The tool 300 also comprises a second shell 320 comprising in its center a second impression 321 corresponding in part to the shape and dimensions of the blade to be produced, the second impression 321 being surrounded by a second contact plane 322 intended to cooperate with the first contact plane 312 of the first shell 310.

The first and second shells can in particular be made of metallic material such as aluminum.

Figure 4:
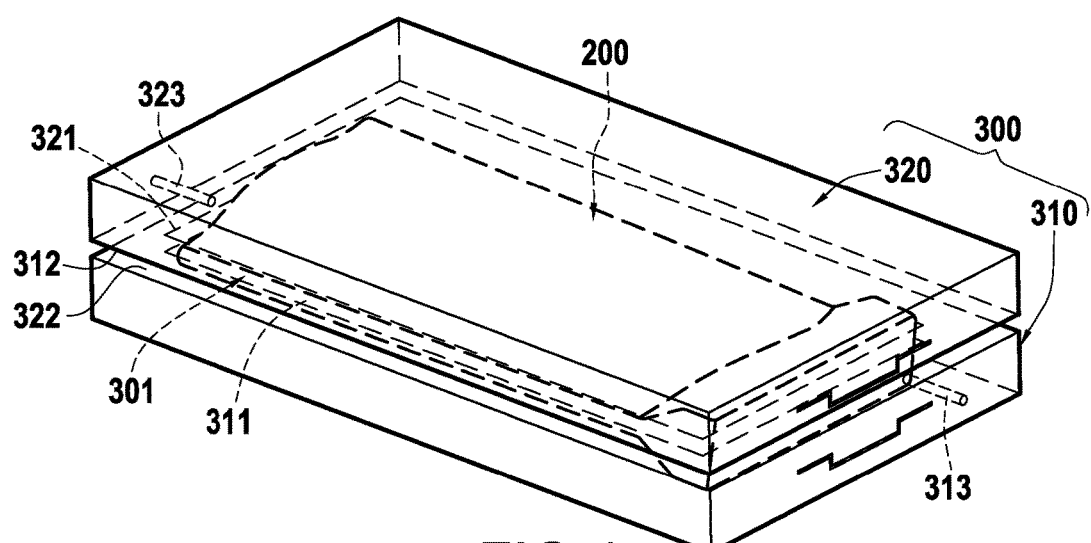
FIG. 4 is a schematic perspective view of the tool of FIG. 3 once assembled.

The fibrous structure 200 is first positioned in the impression 311 of the first shell 310, the second shell 320 then being placed on top of the first shell 310 in order to close the forming tool 300. Once the tool 300 is closed as shown in FIG. 4, the first and second shells are in a position called the "assembly position", i.e., a position in which the first and second impressions 310, 320 are placed opposite each other while the first and second contact planes 312 and 322 are also opposite each other. In this configuration, the first and second impressions 310, 320 together define an internal volume 301 having the shape of the blade to be made and in which the fibrous structure 200 is placed. In the example described here, the impression 311 is intended to form the intrados side of the blade fibrous preform while the impression 321 is intended to form the extrados side of the blade preform.

Figure 5:
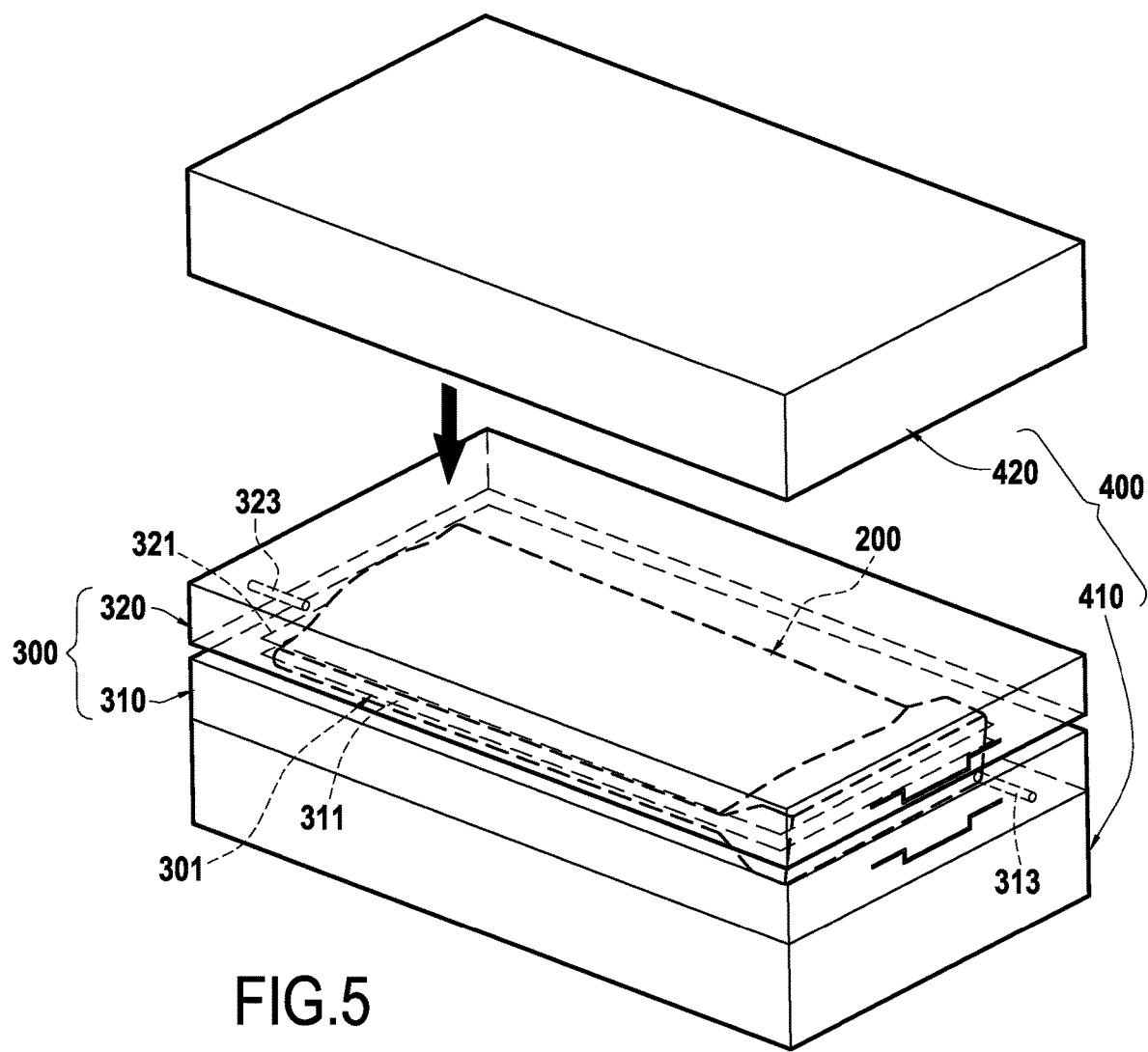
FIG. 5 is a schematic perspective view showing the placement of the forming tool of FIG. 4 in a press.

In FIG. 5, the forming tool 300 with the fibrous structure 200 inside it is placed in a compaction press 400. The press 400 comprises a lower part 410 on which the first shell 310 of forming tool 300 rests and an upper part 420 placed on the second shell 320 of forming tool 300.

Figure 6:
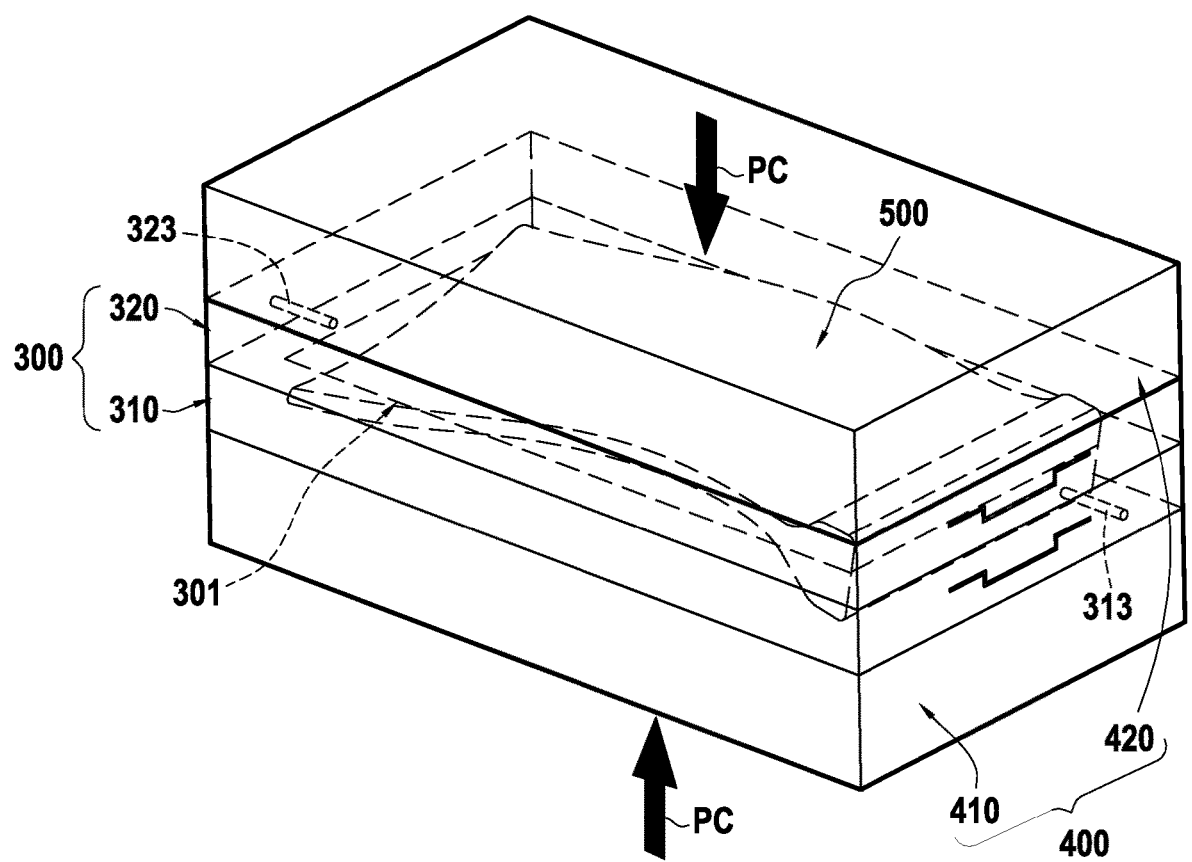
FIG. 6 shows a compacting and forming operation with the tools of FIG. 5.

As shown in FIG. 6, the forming tool 300 is subjected to the application of a compaction pressure PC applied by the press 400. The application of the pressure PC causes the first and second shells 310 and 320 to move closer together until the first and second contact planes 312 and 322 to come together, which at the same time allows the thickness of the fibrous structure to be reduced to the targeted final thickness, the fibrous structure to be compacted at a determined compaction rate in order to obtain an equally determined fiber rate and the fibrous structure to be shaped according to the profile of the blade to be manufactured. The structure having already been pre-compacted, the compaction force applied for final compaction is moderate compared with the compaction force required to directly reduce the thickness of the fibrous structure to the final target thickness. The risks of disturbances in the arrangements between the woven yarns is thus reduced, in particular when the fibrous structure is dry and therefore free of lubricant. A preform 500 with the shape of the blade to be produced is thus obtained.

In accordance with the invention, during the pre-compaction and final compaction steps, the fibrous structure is heated to a temperature greater than or equal to the softening temperature of the sizing composition coating the warp and weft yarns. Such heating softens the fibrous structure and facilitates its shaping without disturbing the weave(s) or weaving pattern(s) of the latter. Indeed, the sizing present on the yarns helps stiffen the fibrous structure, thus preventing the fibers of the weaving yarns from freely following the deformation imposed during compaction. By heating the fibrous structure to a temperature greater than or equal to the softening temperature of the sizing composition coating the yarns, the sizing momentarily loses its tackifying character, thus facilitating slippage between fibers. Moreover, with the shaping process of the present invention, it is no longer necessary to wet the fibrous structure for its compaction as is the case with the solutions of the prior art. Consequently, the fibrous structure is free of water during compaction, which makes it possible to dispense with the subsequent step of drying the preform and thus shorten the manufacturing time of a composite material part. The absence of water in the fibrous structure during compaction also facilitates evacuation of the tool during the injection of the liquid matrix precursor and avoids the appearance of porosity in the composite material of the final part.

As used herein, "softening temperature" means the temperature at which the sizing composition or product loses its tackifying character, thus reducing the adhesion between the fibers which slide freely in relation to each other, allowing the fibrous structure to deform without altering the weaving pattern or weave.

The softening temperature of the sizing composition or agent depends on its chemical composition. In general, the minimum softening temperature of a sizing composition or agent is 50° C.

Heating of the fibrous structure can be carried out before or during its placement in the pre-compaction and forming tool 300. In particular, the fibrous structure can be heated by radiation, for example by means of an infrared lamp, on a support independent of the tools. In this case, it is ensured that the fibrous structure is at a temperature greater than or equal to the softening temperature of the sizing composition before the tool is closed and the compaction pressure is applied.

According to a variant embodiment, the fibrous structure can be heated to a temperature greater than or equal to the softening temperature of the sizing composition once it is inside the pre-compacting or forming tool 300. To this end, the tool and the press can be placed in an oven to bring the tool and the fibrous structure inside to the desired temperature. The forming tool can also heat the fibrous structure itself. In this case, the forming tool 300 is equipped with heating means, for example resistive elements embedded in the walls of the forming tool, which are capable of heating the fibrous structure to a temperature greater than or equal to the softening temperature of the sizing composition.

After the step of shaping by compaction, the preform thus obtained is cooled to a temperature below the softening temperature of the sizing to stiffen the preform before it is removed from the forming tool and to prevent it from deforming during subsequent handling. To this end, the forming tool can for example be cooled by simple venting. The cooling of the forming tool can be accelerated by providing it with cooling means such as for example cooling channels in the tool walls. Cooling the preform below the softening temperature of the sizing composition allows the sizing composition to be restored to its tackifying character in order to stiffen the preform and fix it in its defined shape.

The fibrous preform is then densified. The densification of the fibrous preform intended to form the fibrous reinforcement of the part to be manufactured consists in filling the porosity of the preform, in all or part of its volume, by the material constituting the matrix. This densification is carried out in a manner known per se according to the liquid process (CVI). The liquid process consists in impregnating the preform with a liquid composition containing a precursor of the matrix material. The precursor is usually in the form of a polymer, such as a high-performance epoxy resin, optionally diluted in a solvent. The preform is placed in a mold that can be sealed with a housing having the shape of the final molded blade. Next, the mold is closed and the liquid matrix precursor (for example a resin) is injected into the entire housing to impregnate the entire fibrous part of the preform.

The transformation of the precursor into a matrix, namely its polymerization, is carried out by heat treatment, generally by heating the mold, after removal of any solvent and cross-linking of the polymer, the preform being always held in the mold having a shape corresponding to that of the part to be made.

In the case of the formation of a carbon or ceramic matrix, the heat treatment consists in pyrolyzing the precursor to transform the matrix into a carbon or ceramic matrix depending on the precursor used and the pyrolysis conditions. By way of example, liquid precursors of ceramics, in particular of SiC, can be polycarbosilane (PCS) or polytitanocarbosilane (PTCS) or polysilazane (PSZ) type resins, whereas liquid carbon precursors can be relatively high-coke resins, such as phenolic resins. Several consecutive cycles, from impregnation to heat treatment, can be carried out to achieve the desired degree of densification.

According to one aspect of the invention, in particular in the case of the formation of an organic matrix, the densification of the fibrous preform can be achieved by the well-known resin transfer molding (RTM) process. In accordance with the RTM process, the fibrous preform is placed in a mold with the external shape of the part to be produced. A thermosetting resin is injected into the inner space of the mold that contains the fibrous preform. A pressure gradient is generally established in this internal space between the location where the resin is injected and the resin's evacuation ports in order to control and optimize the impregnation of the preform by the resin.

The injection of a liquid matrix precursor composition into the fibrous structure as well as its transformation into a matrix can be carried out in a specific tool separate from the forming tool 300. In this case, after forming by compaction, the fibrous preform 500 is extracted from the forming tool 300 and placed in an injection tool adapted to the RTM process.

According to a variant embodiment corresponding to the example described here, the steps of injection and of transformation of the liquid matrix precursor composition can be advantageously carried out by keeping the fibrous preform 500 in the forming tool. The need to manipulate the fibrous preform to remove it from the forming tool and place it in an injection tool is thus avoided, as this handling could damage or deform the preform.

In this case, the tool 300 comprises means to carry out these steps. More precisely, in the example described here, the first shell 310 of the tool 300 comprises an injection port 313 intended to allow the injection of a liquid matrix precursor composition into the fibrous preform while the second shell comprises an evacuation port intended to cooperate with a pumping system for evacuating the tool and drawing air during injection.

Figure 7:
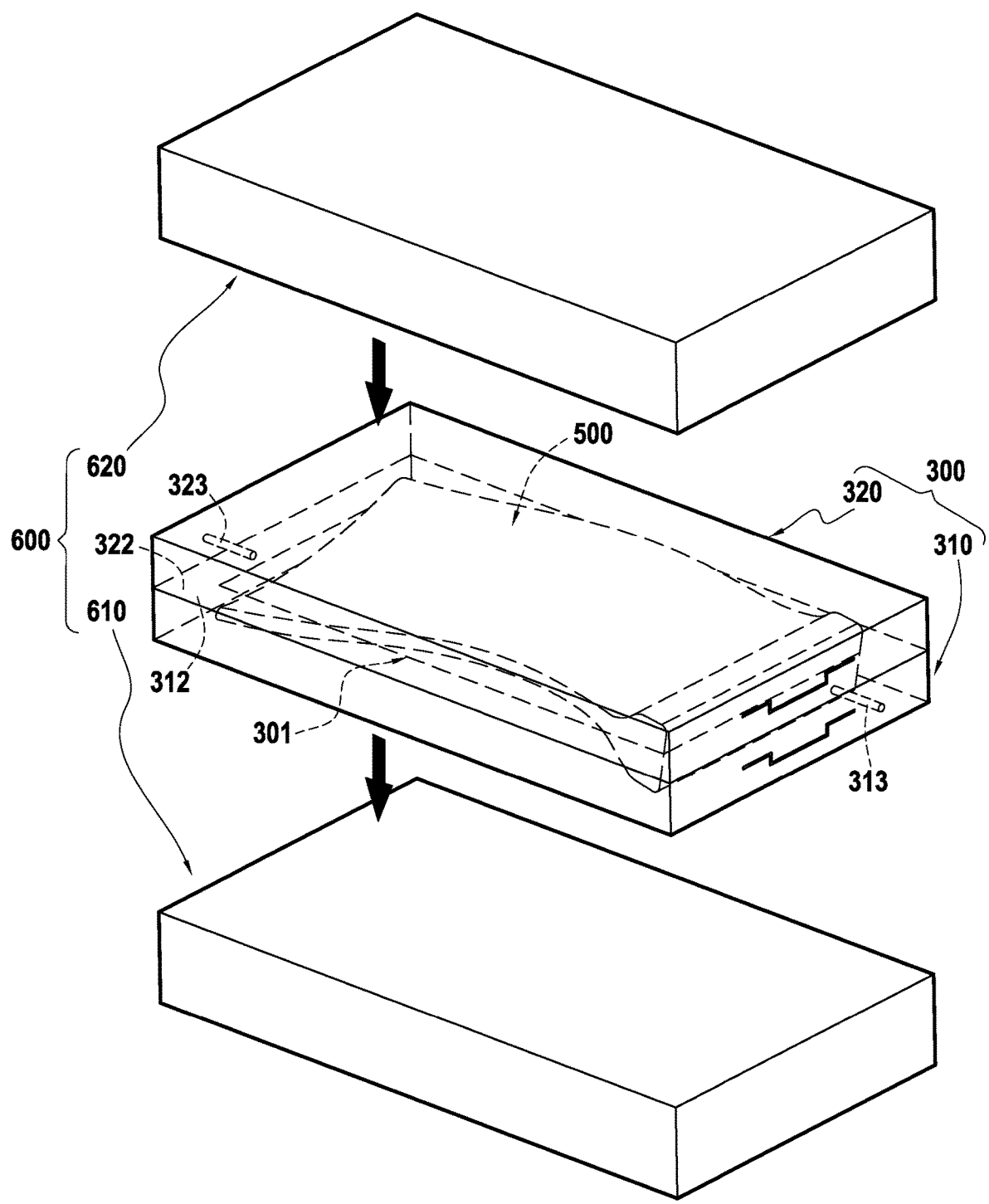
FIG. 7 is a schematic perspective view showing the placement of the forming tool of FIG. 6 in an injection tool.
Figure 8:
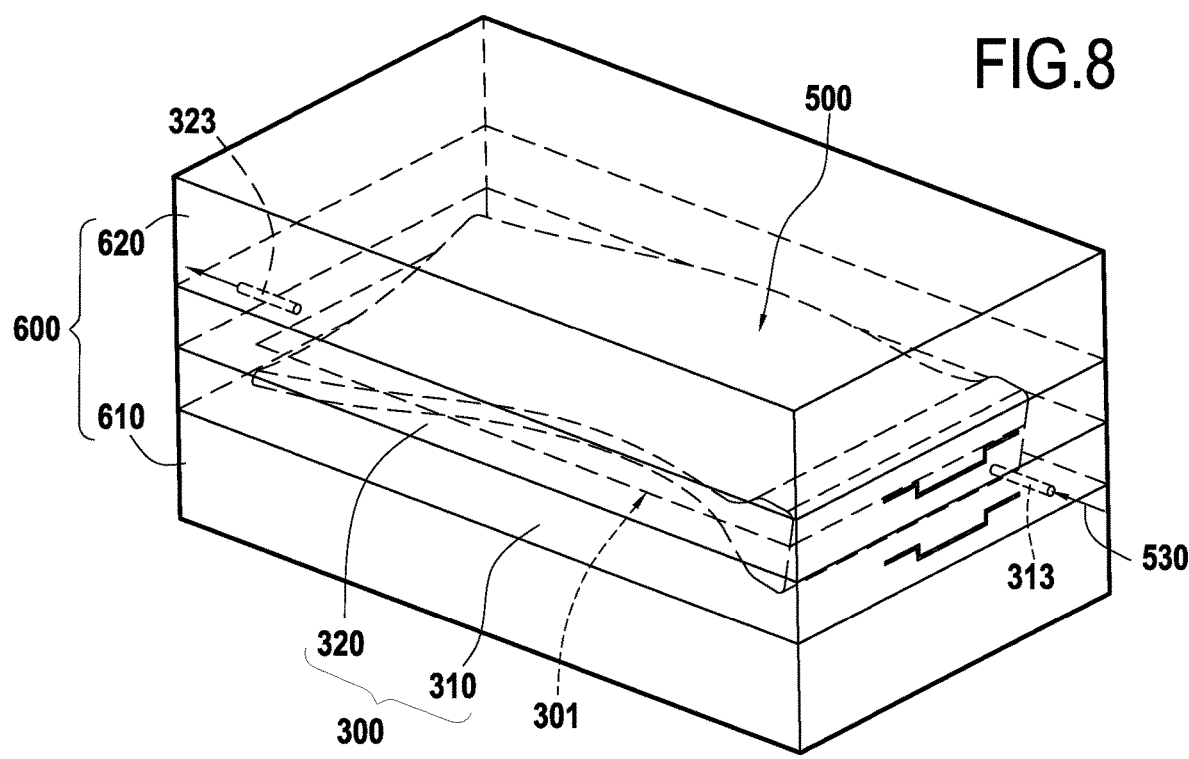
FIG. 8 shows an operation of injection of a liquid matrix precursor composition into a fibrous preform with the tools of FIG. 7.
Figure 9:
FIG. 9 is a schematic perspective view of a turbomachine blade made of composite material obtained in accordance with a manufacturing process of the invention.

The fibrous preform 500 thus protected in forming tool 300 can be transported without risk of deformation to an injection tool, for example a resin transfer molding (RTM) type tool. In FIGS. 7 and 8, the tool 300 is placed between a lower part 610 and an upper part 620 of an injection tool 600 (FIG. 7). The lower part 610 and the upper part 620 of tool 600 are equipped with heating means (not shown in FIGS. 7 and 8).

Once the tool 600 is closed, the blade is then molded by impregnating the preform 500 with a thermosetting resin that is polymerized by heat treatment (FIG. 8). To this end, the well-known injection or transfer molding process known as resin transfer molding (RTM) is used. In accordance with the RTM process, a resin 530, for example a thermosetting resin, is injected via the injection port 313 of the first shell 310 into the internal space 301 defined between the two impressions 311 and 321 and occupied by the preform 500. The port 323 of the second shell 320 is connected to a pressurized exhaust duct (not shown in FIG. 8). This configuration allows the establishment of a pressure gradient between the lower part of the preform 500 where the resin is injected and the upper part of the preform located near the port 323. In this way, the resin 530 injected substantially at the lower part of the preform will progressively impregnate the whole preform by circulating in it up to the evacuation port 323 through which the surplus is evacuated. Of course, the first and second shells 310 and 320 of the tool 300 can comprise several injection ports and several evacuation ports, respectively.

The resin used can be, for example, an epoxy resin of temperature class 180° C. (maximum temperature supported without loss of characteristics). Resins suitable for RTM processes are well known. They preferably have a low viscosity to facilitate their injection into the fibers. The choice of the temperature class and/or the chemical nature of the resin is determined according to the thermomechanical stresses to which the part must be subjected. Once the resin has been injected into the entire reinforcement, it is polymerized by heat treatment in accordance with the RTM process.

After injection and polymerization, the blade is demolded. It can optionally undergo a post-firing cycle to improve its thermomechanical characteristics (increase of the glass transition temperature). Finally, the blade is diverted to remove excess resin and the chamfers are machined. No further machining is necessary since, since the part is molded, it respects the required dimensions.

As illustrated in FIG. 13, a blade 700 formed of a fibrous reinforcement densified by a matrix is obtained.

The invention finds an application in the manufacture of turbomachine blades, in particular fan blades in the aeronautical field.

The invention claimed is:

1. A process for shaping, by compaction, a fibrous structure obtained by three-dimensional or multilayer weaving between a plurality of layers of warp yarns and a plurality of layers of weft yarns, the yarns of each plurality of layers of warp yarns and layers of weft yarns being coated with a sizing composition,
wherein the shaping comprises a step of pre-compaction of the fibrous structure in a pre-compacting tool so as to reduce the thickness of the fibrous structure to an intermediate thickness comprised between the thickness of the fibrous structure after weaving and a determined final thickness, the pre-compaction step being followed by a final compaction step in a forming tool different from the pre-compacting tool so as to reduce the thickness of the fibrous structure to the determined final thickness, and wherein, during the pre-compaction and final compaction steps, the fibrous structure is at a temperature greater than or equal to the softening temperature of the sizing composition to allow fibers of the fibrous structure slide in relation to each other, wherein the process further comprises cooling a fibrous preform obtained after the step of final compaction of the fibrous structure, and
wherein during the pre-compaction step and when the fibrous structure is at a temperature greater than or equal to the softening temperature of the sizing composition, the fibrous structure is deformed in the pre—compacting tool such that the fibers of the fibrous structure slide in relation to each other without altering a weaving pattern of the fibrous structure.

2. The shaping process as claimed in claim 1, wherein the fibrous structure is free of water during the pre-compaction and final compaction steps.

3. The shaping process as claimed in claim 1, wherein the fibrous structure is heated to a temperature greater than or equal to the softening temperature of the sizing composition prior to closing the pre-compacting or forming tool.

4. The shaping process as claimed in claim 1, wherein the pre-compacting tool and the forming tool comprises heating means capable of bringing the fibrous structure to a temperature greater than or equal to the softening temperature of the sizing composition.

5. The shaping process as claimed in claim 1, wherein the forming tool comprises cooling means capable of bringing the fibrous structure to a temperature below the softening temperature of the sizing composition.

6. The shaping process as claimed in claim 1, wherein the pre-compacting tool is a first molding tool and the forming tool is a second molding tool different from the first molding tool, and wherein the first molding tool has internal dimensions that are larger than internal dimensions of the second molding tool to achieve intermediate compaction of the fibrous structure, the internal dimensions of the first molding tool corresponding to an intermediate profile of the fibrous structure and the internal dimensions of the second molding tool corresponding to a final profile of the fibrous structure.

7. The shaping process as claimed in claim 1, wherein the pre-compaction step and final compaction step are carried out without impregnating the fibrous structure with a liquid composition.

8. A process for manufacturing a composite material part comprising:
a) producing a fibrous structure by three-dimensional or multilayer weaving,
b) shaping of the fibrous structure by compaction in accordance with the shaping process as claimed in claim 1,
c) injecting a liquid composition comprising at least one precursor of a matrix material into the fibrous preform,
d) transforming the liquid composition into a matrix so as to obtain a composite material part comprising a fibrous reinforcement densified by a matrix.

9. The process as claimed in claim 8, wherein the step of final compaction of the fibrous structure, the injection of a liquid composition comprising at least one precursor of a matrix material and the transformation of said liquid composition into a matrix are carried out with the preform held in the forming tool, said forming tool comprising at least one injection port.

10. The process as claimed in claim 8, wherein the composite material part corresponds to an aeroengine fan blade.

* * * * *